(12) United States Patent
Yawitz

(10) Patent No.: US 6,597,375 B1
(45) Date of Patent: Jul. 22, 2003

(54) USER INTERFACE FOR VIDEO EDITING

(75) Inventor: Mitchell A. Yawitz, Belmont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/523,450

(22) Filed: Mar. 10, 2000

(51) Int. Cl.[7] .................................................. G09G 5/00

(52) U.S. Cl. ........................ 345/723; 345/724; 345/725

(58) Field of Search ................................ 345/723, 732, 345/819, 817, 119, 811, 829, 724–725

(56) References Cited

U.S. PATENT DOCUMENTS

| | | | | |
|---|---|---|---|---|
| 5,237,648 A | * | 8/1993 | Mills et al. .................. | 345/723 |
| 5,760,767 A | * | 6/1998 | Shore et al. ................. | 345/723 |
| 6,292,620 B1 | * | 9/2001 | Ohmori et al. ............... | 386/55 |
| 6,351,765 B1 | * | 2/2002 | Pietropaolo et al. ......... | 709/218 |

OTHER PUBLICATIONS

Adobe Systems Incorporated, "Adobe Premiere 6.0 Classroom in a Book", 2001, San Jose, CA (pp. 22–35).

* cited by examiner

Primary Examiner—Kristine Kincaid
Assistant Examiner—Lê Nguyen
(74) Attorney, Agent, or Firm—Fish & Richardson P.C.

(57) ABSTRACT

A user interface for selection of a video clip in a video editing system includes a first control element, a first video window, a second control element, and a second video window. The first control element is positionable to select a starting frame of a video clip from a video data source. The first video window is operatively coupled to the first control element to display the starting frame of the video clip. The second control element is positionable to select an ending frame of the video clip. The second video window is operatively coupled to the second control element to display the ending frame of the video clip simultaneously with the display of the starting frame in the first video window. The first video window updates dynamically as the first control element is moved, and the second video window updates dynamically as the second control element is moved.

17 Claims, 2 Drawing Sheets

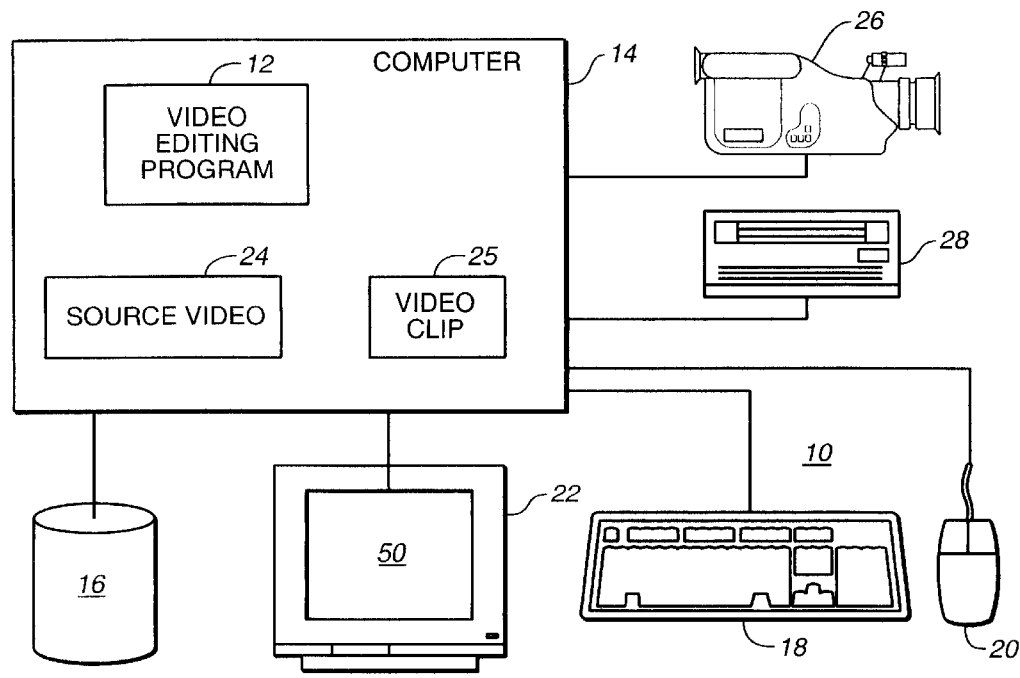
FIG._1
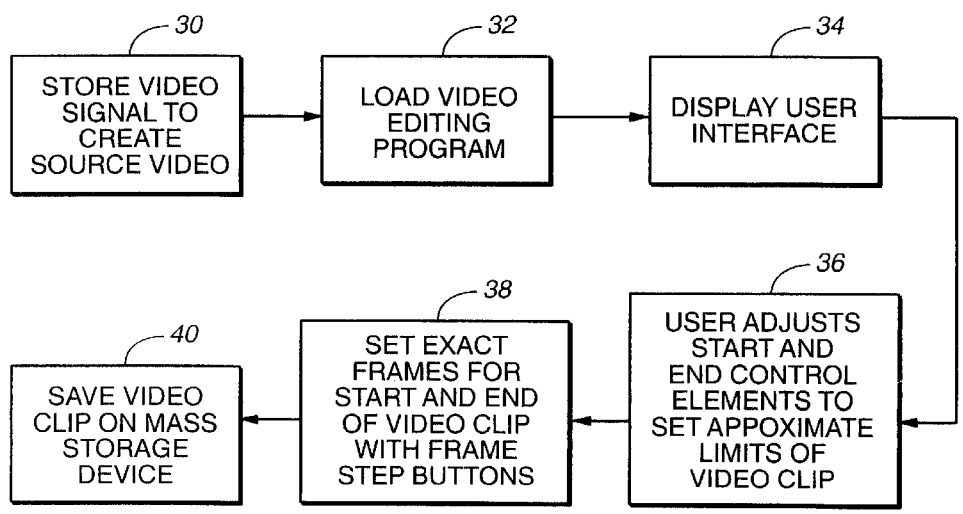
FIG._3

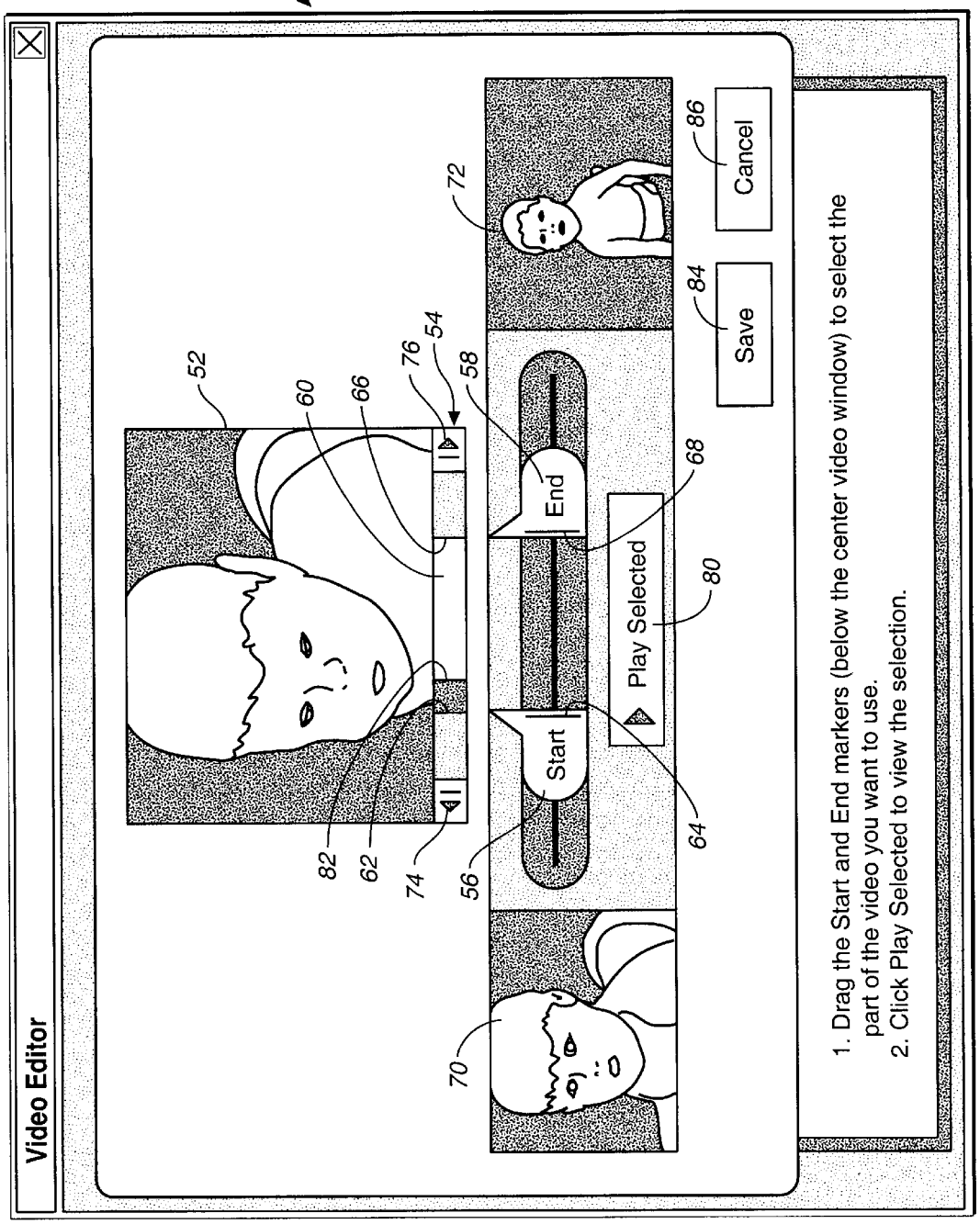

USER INTERFACE FOR VIDEO EDITING

BACKGROUND

The present invention relates to a user interface for a computer-implemented video editing system.

As computers decrease in price and increase in processing power, software-based computer-implemented video editing systems are being purchased by more consumers. Such computer-implemented video editing systems manipulate video data in a digital format, such as the Motion Pictures Expert Group (MPEG) compression format MPEG-2.

A conventional user interface for controlling a video editing system permits a user to select a clip of the video segment being edited. The selected video clip may then be copied or cut and pasted into another video segment. A conventional user interface can include a timeline bar with a fixed length, and two markers or other indicia in the timeline bar to represent the beginning and end of the selected clip. In order to select the video clip from the source video, the user may need to play the source video, stop the video at the frame where the user wishes to start the clip, mark the starting frame, resume playing the video, stop the video again where the user wishes to end the clip, and mark the ending frame. Some users can find these conventional interfaces confusing, unintuitive, inefficient, time-consuming or difficult to master.

SUMMARY

In one aspect, the invention is directed to a user interface for selection of a video clip in a video editing system. The user interface includes a first control element positionable to select a starting frame of a video clip from a video data source, a first video window operatively coupled to the first control element to display the starting frame of the video clip, a second control element positionable to select an ending frame of the video clip, and a second video window operatively coupled to the second control element to display the ending frame of the video clip simultaneously with the display of the starting frame in the first video window. The first video window updates dynamically as the first control element is moved, and the second video window updates dynamically as the second control element is moved.

Implementations of the invention may include one or more of the following features. A third video window may display a frame corresponding to the play point in the video clip. An indicator bar may have a marker that represents the relative location in the video data source of the frame displayed in the third video window. The marker may move linearly along the indicator bar as the video clip is played. The indicator bar may include a highlighted section corresponding to a portion of the video data source located between the starting and ending frames of the video clip. The indicator bar may have a fixed size independent of the length of the video data source. A play button may cause the video clip to be played in the third video window. A frame advance button may adjust one of the starting and ending frames of the video clip by a single frame. The frame advance button may adjust one of the starting and ending frames based on a most recently selected control element from the first and second control elements. The frame advance button may adjust the play point if neither of the first and second control elements is selected. One of the first and second control elements may move as the one of the starting and ending frames is adjusted with the frame advance button.

In another aspect, the invention is directed to a user interface for selection of a video clip in a video editing system. The user interface includes a first control element positionable to select a starting frame of a video clip from a video data source, a first video window operatively coupled to the first control element to display the starting frame of the video clip, a second control element positionable to select an ending frame of the video clip, a second video window operatively coupled to the second control element to display the ending frame of the video clip simultaneously with the display of the starting frame in the first video window, and a plurality of adjustment buttons to adjust one of the starting and ending frames of the video clip forward and backward by a single frame.

Implementations of the invention may include one or more of the following features. The plurality of frame adjustment buttons may adjust one of the starting and ending frames based on a most recently selected control element from the first and second control elements. A third video window may display a frame corresponding to the play point in the video clip. The frame advance button may adjust the play point if neither of the first and second control elements is selected.

In another aspect, the invention is directed to a method performed by a video editing system in selection of a video clip. In the method, a first control element, a first video window, a second control element and a second video window are displayed. The first video window is operatively coupled to the first control element to display a starting frame of a video clip from a video data source. The second video window is operatively coupled to the second control element to display an ending frame of the video clip simultaneously with the display of the starting frame in the first video window. User input is received to position the first control element and select the starting frame of the video clip, and the first video window is dynamically updated as the first control element is moved. User input is received to position the second control element to select the ending frame of the video clip, and the second video window is dynamically updated as the second control element is moved.

In another aspect, the invention is directed to a computer program product tangibly stored on a computer-readable medium to perform the methods or generate the user interfaces of the invention.

Advantages of the invention may include the following. The user interface in the video editing system can visually represent the starting and ending points of a video clip without timestamps. The user interface can correspond more closely to a user's expectations of a video editing session, thereby making the interface more intuitive and decreasing the time needed to select a video clip. Video frames showing both the start and end points of the video clip can be displayed simultaneously with an active video area on a user display. Control elements marking the start and end points of the video clip can be manipulated easily. The video editing system can be implemented on a desktop computer or workstation.

BRIEF DESCRIPTION OF THE DRAWINGS

FIG. 1 is a schematic diagram of a computer system with a video editing system in accordance with the present invention.

FIG. 2 is a schematic illustration of user interface displayed by the video editing system.

FIG. 3 is a flow chart illustrating a method performed by a user of the video editing system.

DETAILED DESCRIPTION

As shown in FIG. 1, a computer-implemented video editing system 10 includes a general purpose programmable digital computer 14 (such as a personal computer or workstation), a mass storage device 16 (such as a magnetic, optical or magneto-optical disk or tape drive), a keyboard 18, a pointer device 20 (such as a mouse), and a display 22. The computer 14 is of conventional construction, and includes a processor capable of executing computer program instructions, and memory for storing programs and data. The computer 14 executes a video editing program 12, and stores one or more source video files 24 and one or more video clips 25 in the memory, on the mass storage device, or on another storage peripheral. In this specification, the term "video" also covers audiovisual data.

The video editing system 10 can be connected to one or more video signal sources 26. The sources can be digital, such as digital camcorder, or analog, such as broadcast television. If the source of the video signal uses an analog format, the video editing system 10 can convert the analog video signal into a digital video signal. This can be done in a variety of ways, such as with a video interface card or as computer software running on the computer 14. Furthermore, the video editing system 10 can be connected to one or more output devices 28 that store or transmit analog or digital video data. The video editing system 10 can also include communications hardware and software by which the computer 14 is connected to other computer systems with an intranet or Internet link to send or receive streaming video data. Although illustrated as an individual computer, the video editing system 10 can be implemented on a computer network, and the data and programs used in the video editing system 10 can be stored and run on separate computers.

When a user desires to select a video clip from a source of video material, the video editing system 10 displays a user interface 50, one particular implementation of which is illustrated in FIG. 2, on the monitor 22. The user interface 50 includes a main active video window 52 in which the source video or video clip can be played, and a time bar 54 positioned below the active video window. The main video window 52 displays the frame from the current play point in the source video or video clip. The time bar 54 has a fixed length L, independent of the length of the source video being edited. Two slidable control elements, including a start point marker 56 and an end point marker 58 are positioned below the time bar 54. The positions of the start and end point control elements 56 and 58 along the bottom edge of the time bar 54 represent the beginning and end of the selected video clip. A highlighted region 60 on the time bar 54 also indicates the relative range of the selected video clip within the source video. As illustrated, a left edge 62 of the highlighted region 60 can be aligned with a right edge 64 of the start control element 56, and a right edge 66 of the highlighted region 60 is aligned with a left edge 68 of the end control element 58.

Two smaller video windows, including a start frame window 70 and an end frame window 72, are located on the left and right sides of the time bar 54 and the control elements 56 and 58. The start frame window 70 displays the frame from the source video corresponding to the start time marked by the start control element 56. Similarly, the end frame window 72 displays the frame from the source video corresponding to the end time marked by the end control element 58.

In operation, a user can drag the either of the control elements 56 or 58 to set the start and end points of the video clip. As the user drags the start control element 56, the frame displayed in the start frame window 70 changes to reflect the changing starting point of the video clip. Similarly, as the user drags the end control element 58, the frame displayed in the end frame window 72 changes to reflect the changing ending point of the video clip.

A backward frame step button 74 and a forward frame advance button 76 are located on the left and right ends, respectively, of the time bar 54. When one of the control elements 56 or 58 is clicked, it becomes selected. Then, when the backward frame step button 74 or forward frame advance button 76 are clicked, the selected control element will be moved backward or forward one frame, and the frame displayed in the associated frame window changes appropriately. Thus, the frame step buttons 74 and 76 permit the starting and ending points of the video clip can be adjusted a frame at a time. If neither of the control elements has been selected, then the frame step buttons 74 and 76 will adjust the play point and the frame displayed in the main video window 52 will change accordingly.

A play/pause button 80 can be located below the control elements 56 and 58 between the start and end frame windows 70 and 72. Pressing the button 80 causes the video clip to be played in the active window 52, e.g., starting at the start time marked by the start control element 56 until the end time marked by the end control element 58. A current frame stripe 82 in the time bar 54 indicates the play point, i.e., the relative position of the frame being played in the source video. Thus, the current frame stripe 82 will move from left to right as the video clip is played. Pressing the button 80 again causes the video in the active window to be paused at the current frame and causes the current frame stripe 82 to halt, until the button 80 is pressed a third time. Fastforward, rewind and stop buttons can also be located can be located below the control elements 56 and 58 for control of the video being displayed in the active window 52. A save button 84 can be used to save the selected video clip on the mass storage device, whereas a cancel button 86 can be used to cancel the editing operation.

As shown in FIG. 3, a user typically begins by storing a video signal from the video input source 26 in a digital format, such as MPEG-2, in the memory or mass storage of the video editing system to create the source video (step 30). The video editing program 12 is loaded (step 32), and the user interface is displayed when the user requests a selection of a video clip from the source video (step 34). The user adjusts the start and end control elements 56 and 58 to set the initial approximate limits for the start and end points of the video clip within the video stream material, using the frames displayed in the frame windows 70 and 72 for reference (step 36). The exact frames of the start and end points can then be set by clicking the frame step buttons 74 and 76 (step 38). Finally, the user saves the selected video clip 25 on the mass storage device by pressing the save button 84 (step 40).

The methods described may be implemented in hardware, firmware, software, or combinations thereof, or in a computer program product tangibly embodied in a computer readable storage device. Storage devices suitable for tangibly embodying the computer program include all forms of volatile and non-volatile memory, including semiconductor memory devices, magnetic disks, magneto-optical disks, and optical disks.

What is claimed is:

1. A user interface for selection of a video clip in a video editing system, comprising;

a first control element positionable to select a starting frame of a video clip from a video data source;

a first video window operatively coupled to the first control element to display the starting frame of the video clip, the first video window being dynamically updated as the first control element is moved;

a second control element positionable to select an ending frame of the video clip;

a second video window operatively coupled to the second control element to display the ending frame of the video clip simultaneously with the display of the starting frame in the first video window, the second video window being dynamically updated as the second control element is moved; and a frame step button to adjust one of the first and second control elements.

2. The user interface of claim 1, further comprising a third video window to display a frame corresponding to the play point in the video clip.

3. The user interface of claim 2, further comprising an indicator bar having a marker that represents the relative location in the video data source of the frame displayed in the third video window.

4. The user interface of claim 3, wherein the marker moves linearly along the indicator bar as the video clip is played.

5. The user induce of claim 3, wherein the indicator bar includes a highlighted section corresponding to a portion of the video data source located between the starting and ending frames of the video clip.

6. The user interface of claim 3, wherein the indicator bar has a fixed size independent of the length of the video data source.

7. The user interface of claim 2, further comprising a play button to cause the video clip to be played in the third video window.

8. The user interface of claim 1, wherein the frame step button further adjusts one of the starting and ending frames of the video clip by a single frame.

9. The user interface of claim 8, wherein the frame step button adjusts one of the starting and ending frames based on a most recently selected control element from the first and second control elements.

10. The user interface of claim 9, wherein one of the first and second control elements moves as the one of the starting and ending frames is adjusted with the frame step button.

11. The user interface of claim 9, further comprising a third video window to display a frame corresponding to the play point in the video clip.

12. The user interface of claim 11, wherein the frame step button adjusts the play point if neither of the first and second control elements is selected.

13. A user interface for selection of a video clip in a video editing system, comprising:

a first control element to select a starting frame of a video clip from a video data source;

a first video window operatively coupled to the first control element to display the starting frame of the video clip;

a second control element to select an ending frame of the video clip;

a second video window operatively coupled to the second control element to display the ending frame of the video clip simultaneously with the display of the starting frame in the first video window;

a plurality of adjustment buttons to adjust one of the starting and ending frames of the video clip forward and backward by a single frame, wherein the plurality of frame adjustment buttons adjust one of the starting and ending frames based on a most recently selected control element from the first and second control elements.

14. The user interface of claim 13, further comprising a third video window to display a frame corresponding to a play point in the video clip.

15. The user interface of claim 14, wherein the plurality of adjustment buttons adjust the play point if neither of the first and second control elements is selected.

16. A method performed by a video editing system in selection of a video clip, comprising:

displaying a first control element;

displaying a first video window operatively coupled to the first control element to display a starting frame of a video clip from a video data source;

receiving user input to position the first control element and select the starting frame of the video clip;

dynamically updating the first video window as the first control element is moved;

displaying a second control element;

displaying a second video window operatively coupled to the second control element to display an ending frame of the video clip simultaneously with the display of the starting frame in the first video window;

receiving user input to position the second control element to select the ending frame of the video clip;

dynamically updating the second video window as the second control element is moved; and receiving user input from an adjustment button to adjust one of the first and second control elements.

17. A computer program product tangibly stored on a computer-readable medium to select a video clip in a video editing system, the program comprising instructions operable to cause a programmable processor to:

display a fast control element;

display a first video window operatively coupled to the first control element to display a starting frame of a video clip from a video data source;

receive user input to position the first control element and select the starting frame of the video clip;

dynamically update the first video window as the first control element is moved;

display a second control element;

display a second video window operatively coupled to the second control element to display an ending frame of the video clip simultaneously with the display of the starting frame in the first video window;

receive user input to position the second control element to select the ending frame of the video clip;

dynamically update the second video window as the second control element is moved; and receive user input from an adjustment button to adjust one of the first and second control elements.

* * * * *

UNITED STATES PATENT AND TRADEMARK OFFICE
CERTIFICATE OF CORRECTION

PATENT NO.      : 6,597,375 B1                                                            Page 1 of 1
DATED           : July 22, 2003
INVENTOR(S)     : Mitchell A. Yawitz It is certified that error appears in the above-identified patent and that said Letters Patent is hereby corrected as shown below:

Column 5,
Line 23, replace "induce" with -- interface --.

Signed and Sealed this

Twenty-third Day of September, 2003

JAMES E. ROGAN
*Director of the United States Patent and Trademark Office*